United States Patent [19]

Cetnarowski

[11] Patent Number: 4,611,797
[45] Date of Patent: Sep. 16, 1986

[54] FLUID-POWERED ROTARY TABLE

[76] Inventor: Robert Cetnarowski, 6080 Maple La., Pearl Beach, Mich. 48052

[21] Appl. No.: 637,749

[22] Filed: Aug. 6, 1984

[51] Int. Cl.⁴ .............................................. B23Q 1/16
[52] U.S. Cl. ........................................ 269/57; 269/58; 269/69
[58] Field of Search ......................... 269/20, 57, 58, 63, 269/69; 92/121; 82/36 A; 408/71; 409/221

[56] References Cited

U.S. PATENT DOCUMENTS

| | | |
|---|---|---|
| 2,534,882 | 12/1950 | Sherr . |
| 3,424,319 | 1/1969 | Hohlfelder, Jr. et al. ......... 269/57 X |
| 3,528,328 | 9/1970 | Jeanneret ............................. 82/36 A |
| 3,647,043 | 3/1972 | Garetto ............................. 269/57 X |
| 3,658,315 | 4/1972 | Boucherie ............................. 269/20 |
| 3,825,245 | 7/1974 | Osburn et al. . |
| 4,380,939 | 4/1983 | Gardner ............................. 269/69 X |
| 4,381,858 | 5/1983 | Riche . |

OTHER PUBLICATIONS

Chilton's Product Design & Development Magazine, vol. 39, No. 7; Rotac Fluid-Powered Rotary Actuator; p. 90.
Chilton's Product Design & Development Magazine, vol. 39, No. 7; Multi-Angle Rotary Actuator of Rotomation; p. 45.
Parker Fluid Power brochure, Hydraulic Cylinder Cushioning; of unknown date.
Aeroquip QR-70 Super Cushion brochure of unknown date.

*Primary Examiner*—Frederick R. Schmidt
*Assistant Examiner*—Steven P. Schad
*Attorney, Agent, or Firm*—Burton, Parker & Schramm

[57] ABSTRACT

A fluid-powered rotary table formed of a base and a rotary housing which sealingly cooperates therewith along a planar surface. A toroid-shaped annular cavity is formed between the base and the rotary housing which are rotatable relative to one another along a central axis perpendicular to the plane and the toroid-shaped annular cavity. The annular cavity is divided into two fluid-tight annular segments by a stationery block affixed to the base and projecting into the cavity and a rotary block affixed to the rotary housing and projecting into said cavity. By admitting or removing fluid from each of the annular cavity segments the rotary housing may be moved relative to the base.

18 Claims, 2 Drawing Figures

FLUID-POWERED ROTARY TABLE

FIELD OF INVENTION

This invention relates to the field of rotary tables and more particularly to rotary tables powered by a pressurized fluid such as air, oil, or hydraulic fluid.

BACKGROUND OF INVENTION

Rotary tables, particularly those used in the machine-tool industry are typically constructed using a rotary plate, pivotably mounted to a base with some mechanical means for moving the plate relative to the base. A wide variety of mechanical mechanisms having been used for rotating a plate relative to the base such as a gear and pinion or worm screw and ring gear. In other applications where close tolerance is not necessary, or where the table location need not be infinitely adjustable, cam and Geneva mechanisms have been employed.

Various rotary tables have been made in the past using a fluid-powered unit, such as a hydraulic cylinder, as a drive means. Rotary tables have been made using a rack gear which drives a rotating pinion coupled to the table, where the rack is moved linearly by conventional hydraulic cylinder. Hydraulic cylinders having a rack integrally formed in the pistonrod are manufactured by Ohio Oscillator, Inc. and are commercially available. Another prior art method of using a standard hydraulic cylinder to power a rotary table is shown in U.S. Pat. No. 3,825,245 (Osborne). The Osborne patent discloses a pallet changer which uses a standard hydraulic cylinder which is attached at one end to the base and at the other end to the rotary plate at a point spaced from the centerline of rotation so that the linear movement of the cylinder causes rotation of the base relative to the plate. The Osborne device is designed to rotate 180 degrees quickly and accurately.

The principal disadvantage of the gear-driven mechanical tables is that they are slow and very expensive to manufacture if accuracy is desired. The cam or Geneva drive mechanical rotary tables operate faster and are somewhat less expensive, however, it is difficult to accurately control relative motion and the mechanism is frequently bulky. Hydraulic systems having a linear cylinder are likewise bulky and the travel is limited by the cylinder length.

SUMMARY OF INVENTION

I have discovered a fluid-powered rotary table which is compact, can be rotated rapidly and can be stopped at predetermined positions with precise accuracy. My fluid-powered rotary table has a minimum number of working parts and can be manufactured cost-effectively.

The fluid-powered rotary table has a base and a rotary housing which is pivotably attached thereto. The base is sealably attached to the rotary housing along a common plane. The annular cavity is defined by the base and rotary housing which is concentric with the axis of rotation and is perpendicular to the common plane. A stationary block is fixed to the base and projects into the annular cavity sealingly interfacing with the rotary housing. A somewhat similar rotary block is attached to the rotary housing and projects into the annular cavity sealingly mating with the portion of the annular cavity defined by the base. These two blocks divide the annular cavity up into two separate fluid-tight annual segments. When the rotary housing is turned relative to the base, one of the annular segments will increase in volume while the other segments will decrease correspondingly. Fluid feed passageways are provided in each of the annual cavities so that a pressurized fluid such as air, oil or hydraulic fluid can be used to rotate the housing relatvie to the base. In order to minimize leakage of the pressurized fluid from the fluid-tight annual cavity segments, preferably seals are provided between the base and the rotary housing as well as on the portion of the stationary block and rotating block outer edges which cooperate with a moving surface.

My invention may be further provided with movable stops which can be attached to either the base or the rotary housing which engage a stop on the opposite part to fix the annular rotation of the rotary housing relative to the base at a predetermined point. I found that by attaching a clockwise and counter-clockwise stop on the rotary housing which cooperates with a fixed stop fixed to the base, the rotary table can be moved easily and quickly from one stop to the other, the angular range being adjustable from 0 to 315 degrees.

BRIEF DESCRIPTION OF THE PREFERRED EMBODIMENT

Figure 1:
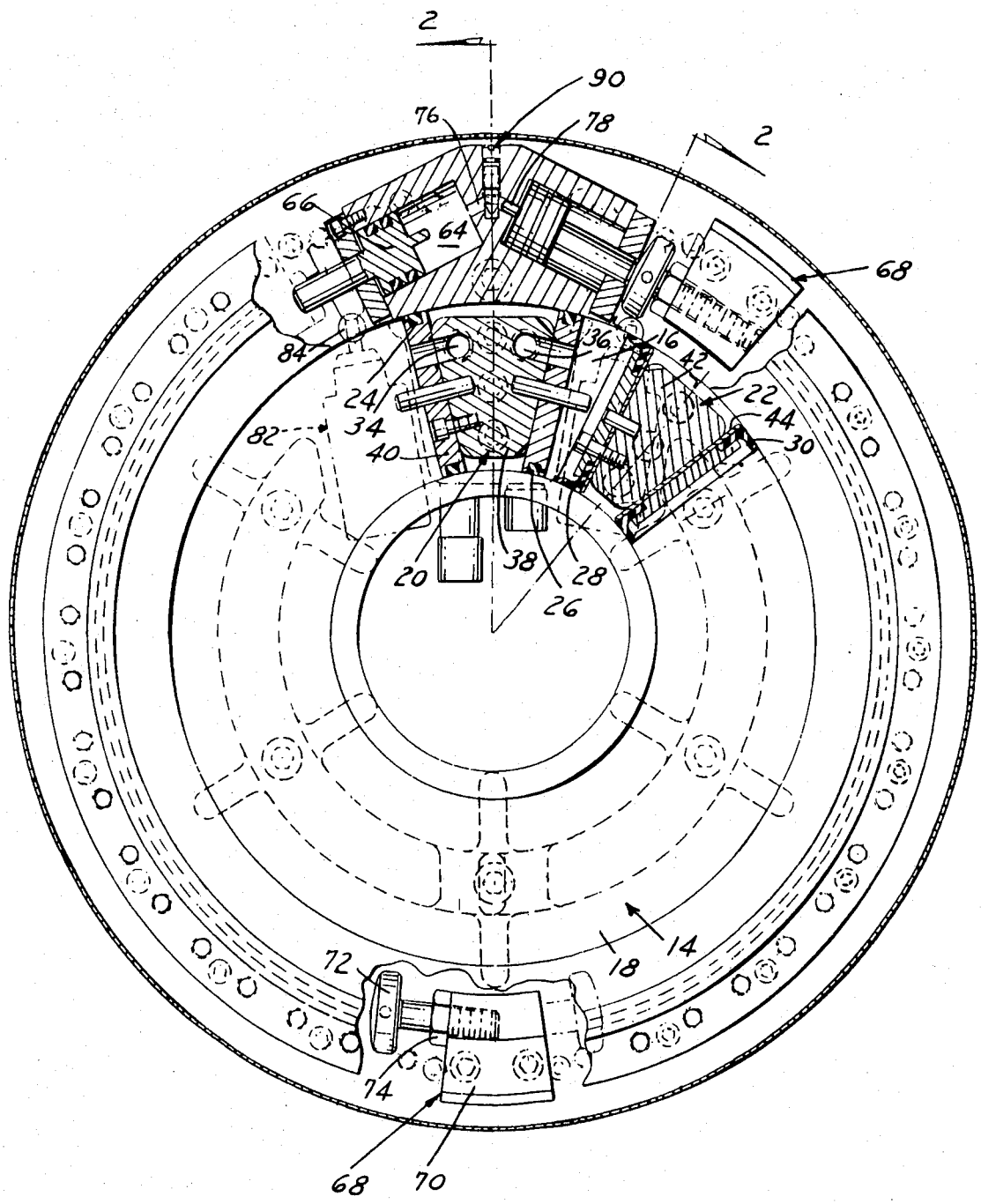
FIG. 1 is a top plan view of the rotary table with the internal components thereof shown in phantom view and in cut-away section.

Referring to the drawings the novel fluid-powered rotary table is comprised of two main components, a base 10 and a rotary housing 12. The rotary housing pivotably cooperates with the base along the plane A—A so as to be rotatable about axis X—X. The annular cavity 14 lies between base 10 and the rotary housing, the walls of which are defined at least in part by portions of the base and the rotary housing. The annular cavity 14 is concentric with axis X—X and lies in a plane generally perpendicular to axis X—X, forming a toroid-shaped volume.

In the preferred embodiment of the invention shown in the drawings the annular cavity 14 is entirely defined by portions of base 10 and rotary housing 12. It is within the scope of this invention to include an intermediate housing between said base and rotary housing which could comprise a portion of the annular cavity wall. In such event the base would cooperate with the intermediate housing and the intermediate housing would then cooperate with the rotary housing and the same general result would be achieved. In the preferred embodiment of the invention shown in the drawings, the annular chamber 14 is divided into two annular cavity segments, 16 and 18. The annular cavity segments are defined by stationary block 20 which is attached to the base 10 and projects into the annular cavity for sealingly cooperating with a portion of the annular cavity formed by the rotary housing 12. A rotary block 22 is affixed to the rotary housing 12 and similarly projects into the annular cavity sealingly cooperating with the portion of the annular cavity defined by the base 10. In order to facilitate the sealing of the stationary block to the rotary housing the stationary block is provided with seals 24 and 26. The rotary block 22 is similarly provided with the seals 28 and 30.

With reference to FIG. 1 the rotary housing is shown in the full counter-clockwise position causing the first annular cavity 18 to be of larger volume than second annular cavity 16. if the rotary housing 12 with the rotary block 22 attached thereto would be rotated clockwise from the position shown in FIG. 1, the first annular cavity 18 would decrease in volume while the second annular cavity 16 would correspondingly increase in volume. To facilitate the admission or removal of fluid from each of the annular cavity segments, stationary block 20 is provided with a first and second port 34 and 36 communicating with the first annular cavity 18 and the second annular cavity 16 respectively. When it is desired to rotate the rotary housing clockwise relative to the base, fluid is admitted into the second annular cavity 16 via port 36 and fluid may be removed from the first annular cavity 18 via port 34. The rotary table may be powered by any pressurized fluid such as compressed air or standard hydraulic fluid. The invention will function in a similar manner whether powered by a compressable gaseous fluid or a generally incompressable liquid fluid. Minor modifications in seals and the like may be required to operate the device using a liquid versus a gaseous fluid.

Figure 2:
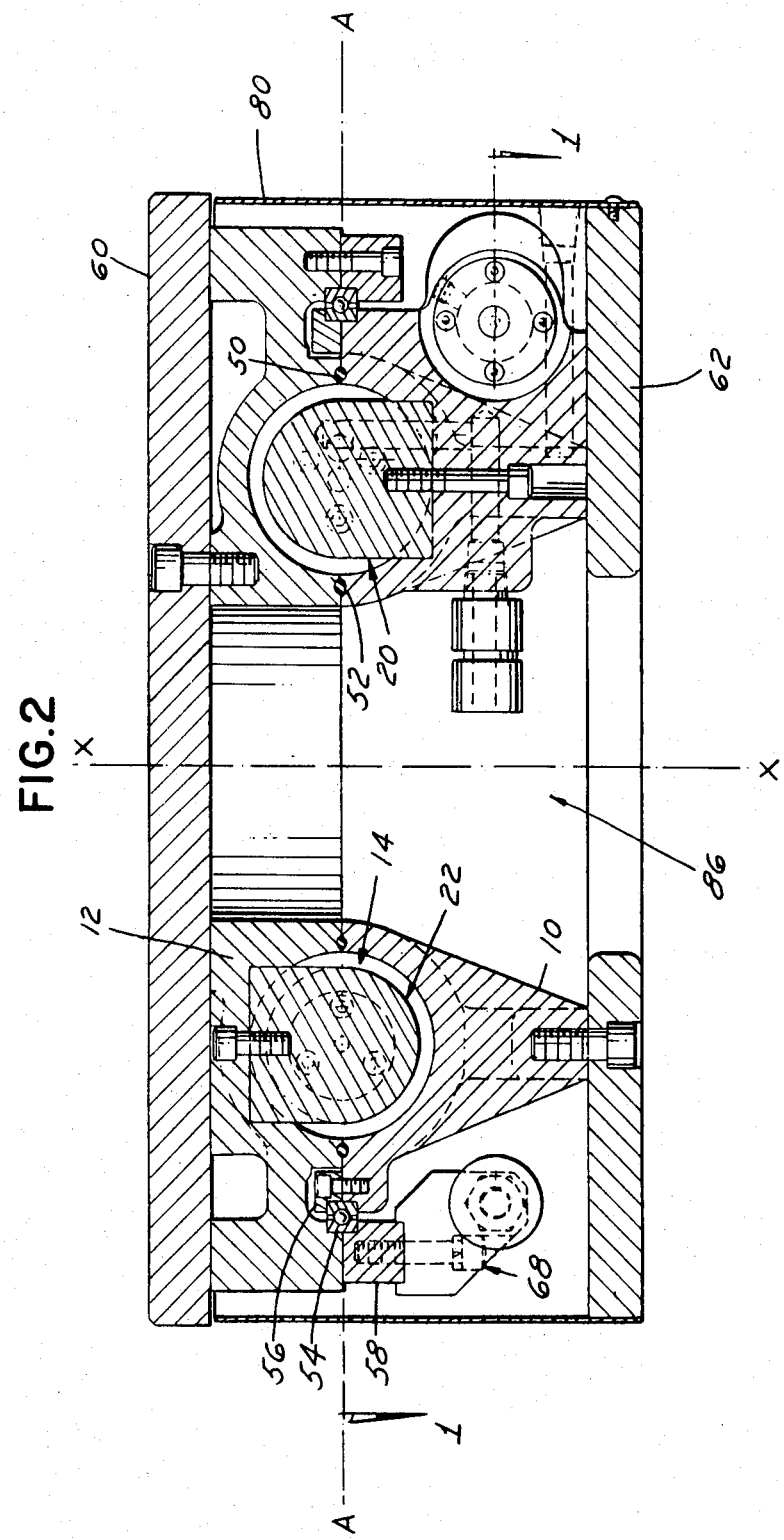
FIG. 2 is a cross-sectional side elevation taken on line 2—2 of FIG. 1, showing the relationship between the base, rotary housing, stationary block and rotary block.

A preferred stationary and rotary block construction is shown in FIGS. 1 and 2. Stationary block 20 is comprised of a stationary back-up block 38 and seal retaining plates 40 attached to each side of the back-up block. The seal retaining plates 40 hold stationary block seals 24 and 26 in fluid-tight engagement with the walls of the annular cavity. Port 34 and 36 pass through base 10, stationary back-up block 38, and seal retaining plates 40 to exit into their respective annular cavity segments. Seals such as an O-ring or a gasket are preferably incorporated between the seal retaining disk 40 and stationary back-up block 38 to maintain ports 34 and 36 fluid-tight. Constructing the stationary block of a back-up block 38, a pair of seal retaining disks 40 eliminates the need to manufacture the stationary block to conform to the annular cavity segment. Seal retaining disk 40 when employed with an annular cavity of a circular cross-section may be easily machined using a simple turning operation.

An alternative seal structure is shown in FIG. 1 in conjunction with rotary block 22. Rotary block 22 is comprised of a back-up block of 42 and a pair of back-up disks 44 attached to each side of the back-up block. Cupped seals 28 and 30 are attached to each back-up disk 44 with cup seal retainers to create oppositely disposed faces defining a boundry of one of said fluid-tight annular segments.

Back-up blocks 38 and 42 are attached to the base and rotary housing respectively using conventional means such as bolts shown in FIG. 2. While it would be possible to form the back-up block integrally with the base or the rotary housing, it is preferred for ease of machining the annular cavity to attach the back-up block subsequently. In the preferred embodiment shown in the drawings the rotary housing cooperates directly with the base along plane A to define the annular cavity. Seals 50 and 52 are provided between the base and rotary housing in order to maintain the annular cavity segments fluid-tight and independent of one another. Preferably the base is spaced apart from the rotary housing 0.002–0.004 inches. Seals 50 and 52 may be of a conventional O-ring design lying in a cavity formed in the base 10, the rotary housing 12 or partially in each as shown. Seals 50 and 52 lie in plane AA and are concentric with axis XX. It is preferred that seals 50 and 52 be located as near the annular cavity as possible so as to minimize the leakage along a circumferential path between the seal and the cavity wall.

The rotary housing 12 is preferably attached to the rotary base 10 using a precision ring bearing unit 54. One race of the ballbearing unit is affixed to the base using retaining ring 56 and the other race of the ballbearing unit is attached to the rotary housing by retaining ring 58. The ballbearing unit 54 is coaxial with axis XX and allows the rotary housing to be freely rotated relative to the base maintaining proper axial spacing and preventing lateral movement.

As shown in FIG. 2 the preferred embodiment is provided with a top plate 60 and a bottom plate 62. The top plate provides a general planar upper surface suitable for attaching a workpiece to the rotary table. The top plate 60 is preferably bolted to a rotary housing, however, it is possible to integrally form the top plate with the rotary housing 12. Similarly, the bottom plate 62 preferably has a planar lower surface and is bolted to the base 10. Again, the bottom plate could also be integrally formed with the base, if so desired.

The preferred embodiment is provided with means to stop the rotation of the rotary housing relative to the base at a predetermined angular orientation. Preferably there will be a counter-clockwise stop and a clockwise stop so that the rotary table may be moved relative to the base throughout a predetermined angular range. The maximum angular range will be significantly less than 360 degrees due to the space occupied by the stationary block and the rotary block. In the embodiment shown in the drawings, the maximum angular travel is approximately 270 degrees. If additional travel is desired, the stationary block and rotary block could be designed thinner and maximum angle of travel could be increased to approximately 315 degrees. Further increase in maximum angle of travel may be possible particularly if a very large diameter annular cavity was used, however, a table capable of turning 270 degrees is sufficient for the vast majority of applications.

An adjustable stop system employing a hydraulic cushion to gradually decelerate the rotary table relative to the base is shown in FIG. 1. This hydraulic cushion system is particularly useful in the pneumatic version of this invention where the speed of the rotary housing relative to the base is more difficult to control due to the compressibility of the working fluid. A stop housing body is integrally formed in base 10 having machined therein oppositely disposed cylindrical bores 64. In each bore is a spool 66 sealingly slideable along the axis of the cylinder and defining an internal cylindrical cavity. The axis of each cylindrical bore 34 lies in a plane generally parallel to plane A—A and is tangent to the arc in which adjustable stop 68 travels. Adjustable stop 68 is comprised of a block 70 and a button 72. Stop block 70 may be attached to the rotary housing at a number of radial positions. Stop block 70 is preferably attached to the rotary housing retaining ring 58 which is provided with a number of threaded radially spaced holes for easy attachment. In order to make minute adjustments in the stop position, button 72 may be threaded into block 70 and affixed at the desired angular position by jam nut 74.

When the rotary housing is turned relative to the base and the desired stop position is approached, button 72 will engage one end of spool 66 and axially sliding the spool into cylindrical bore 64. As the spool moves in the cylindrical bore, the hydraulic fluid contained in the cavities formed thereby is displaced through stop-fluid port 76. A needle valve 90 forms a variable restrictive opening in the stop-fluid port 76 to regulate the flow of hydraulic fluid out of the cavity and the cushion. Preferably spool 66 is provided with a small pintle 78 having a variable cross-sectional area for cooperating with stop-fluid port 76 to vary the effective area thereof. When the port is open, the spool 66 will move relatively easily within the cylindrical bore, restrained only by the needle valve 90, but as the final stop position is approached, the pintle 78 will obstruct fluid port 76 increasing the force required to move the spool along the cylinder axis and causing the rotary housing to come to a gentle stop. A preferred pintal design is a straight, cylindrical shape with a flat machined thereon along a plane inclined relative to the axis to the spool. The flat being larger near the tip of the pintle and gradually decreasing in size. An alternative pintal design would be the conventional tapered style symetrical about the spool centerline.

In order to prevent the working parts of the rotary table from being exposed, particularly the moving stops, it is preferred that a shroud 80 be installed around the circumference of the apparatus. The shroud 80 can altenatively be attached to a stationary or rotating part. In FIG. 2, shroud 80 is shown releaseably attached to base plate 62. It is frequently necessary to remove the shroud when the stop adjustment is required. Any conventional releasable attachment means may be employed. It is preferred that this shroud be of a cylindrical design giving the rotary table a neat, clean, cylindrical appearance.

To provide a means for sensing the position of the rotary housing, the preferred embodiment of the invention shown is provided with a limit switch 82. The limit switch has a roller 84 positioned to detect the presence of adjustable stop button 72 when the rotary housing is at one of the stop positions. In FIG. 1, limit switches 82 are shown in phantom outline and therefore, oriented to sense the presence of adjustable stop button 72. A number of alternative means for sensing the relative position of the rotary housing and the base could be developed using known technology and is within the scope of the invention. If it is desired to have the capability of detecting the angle or position of the rotary housing relative to the base at all angles, a precision multi-turn resistor assembly or an optical shaft encoder device could be installed in the base so as to rotably cooperate with to the rotary housing to provide a signal for detecting rotary housing position at all times.

It should be noted as shown in FIG. 2 that the central portion of the rotary table as shown in FIG. 2 is entirely open. Devices attached to the table, such as industrial robots frequently require electrical and fluid connections. These connections can be routed through the central cavity in the rotary table and through the top plate 60 to be coupled to the device attached thereon. This open central cavity 86 which can be formed using the present invention allows fluid and electrical connections to be made to the part attached to the rotary table without the need for expensive rotary couplings. Due to the limited angle of travel of the rotary table relative to the base, flexible hoses and electrical connections can be merely twisted through the operating range of the device.

It will be understood, of course, that while the form of the invention herein shown and described, constitutes a preferred embodiment of the invention, it is not intended to illustrate all possible forms of the novel fluid-powered rotary table. It should also be understood that the words used in the specification are words of description rather than words of limitation and that various changes may be made without departing from the spirit and scope of the invention herein disclosed.

I claim:

1. A fluid-powered rotary table comprising:
    a base having a sealing surface parrallel to a plane;
        a rotary housing having a sealing surface for cooperating with the sealing surface of said base, said rotary housing being pivotably attached to said base and rotatable about a central axis perpendicular to said plane to define a toroid-shaped annular cavity;
        a stationary block fixed to said base, projecting into said annular cavity and sealingly cooperating with said rotary housing;
    a rotary block fixed to said rotary housing and projecting into said annular cavity sealingly cooperating with said base to divide said annular cavity into two separate fluid-tight annular segments whereby the rotation of the rotary housing relative to the base causes one annular segment to increase in volume and the other annular segment to correspondingly decrease;
    fluid passage means for admitting and removing fluid from each of said annular segments for causing the rotation of the rotary housing relative to the base; and
    clockwise and counter-clockwise stop means to stop the rotation of the rotary housing relative to the base at variable predetermined annular clockwise and counter-clockwise orientations with at least one of said stop means being adjustable enabling the total travel of said rotary housing relative to the base to be varied.

2. The invention of claim 1 wherein both said clockwise and counter-clockwise stop means are adjustable and each further comprise a stop affixed to said base and a rotatable stop fixed to said rotary housing, said stops engaging one another at a variable predetermined angular position preventing further rotation of the rotary housing relative to said base.

3. The invention of claim 2 further comprising cushion means for gradually decelerating the rotary housing when said rotary stop means engages said stop means affixed to said base.

4. The invention of claim 3 wherein said stationary stop means is attached to said base and provided with said cushion means further comprised of a pair of oppositely-facing cylindrical bores each having a spool slideably mounted therein, said spool cooperating with the rotatable stop means to gradually decelerate the rotatable housing.

5. The invention of claim 1 further comprising bearing means cooperating with said base and said rotary housing to retain same in coaxial rotatable orientation.

6. The invention of claim 5 wherein said toroid-shaped annular cavity has a circular cross-section, half of said cavity being defined by an annular groove in said base and the other half defined by an annular groove in said rotary housing.

7. The invention of claim 6 further comprising seal means operating with said base and said rotary housing to maintain said annular segments fluid-tight.

8. The invention of claim 7 wherein said seal means further comprises a pair of elastic seal rings trapped in between said rotary housing and said base in a pair of seal cavities, said seal cavities being concentric with said central axis, one seal cavity being larger than said annular cavity and the other smaller.

9. The invention of claim 1 further comprising a top plate having a planar upper surface and a lower surface, said lower surface affixed to said rotary housing.

10. The invention of claim 9 further comprising a bottom plate having a planar lower and upper surface, and on access hole centrally formed therein, said bottom plate being affixed to said base.

11. The invention of claim 10 further comprising a cylindrical shroud extending between said top plate and said bottom plate being removably detachable to one of same.

12. A fluid-power rotary table comprising:
a base having an upper sealing surface;
a rotary housing having a lower sealing surface for cooperation with said base sealing surface along a common plane, said rotary housing being pivotably attached to said base rotatable about an axis perpendicular to said plane to define toroid-shaped annular cavity formed therebetween concentric with said axis.
a stationary block fixed to said base and projecting into said cavity having an outer edge sealingly cooperating with said rotary housing;
a rotary block fixed to said rotary housing and projecting into said annular cavity having an outer edge sealingly cooperating with the said base;
said stationary block and rotary block dividing annular segments whereby rotation of the rotary housing relative to the base will cause one segment to increase in volume and the other to correspondingly decrease;
fluid passage means in said stationary block for admitting and removing fluid from each of said annular cavity segments to cause the rotary housing to move relative to the base;
means to stop the rotation of the rotary housing in a clockwise and counter-clockwise position, said stop means mounted in said base and rotary housing and being adjustable to provide from 0 to 315 degrees of relative rotation;
a bearing means cooperating with said rotary housing and said base retaining same in rotatable axial alignment; and means for sealing said rotary housing to said base to sealingly separate said two fluid-tight annular segments allowing rotation of the rotary housing relative to the base.

13. The invention of claim 12 further comprising means to sense the position of the rotary housing relative to the base.

14. The invention of claim 12 wherein said base is provided with a central access hole within and generally coaxial with the annular cavity.

15. The invention of claim 14 wherein said rotary housing is provided with a central access hole coaxially aligned with the central axis hole in the base.

16. A fluid-powered rotary table comprising:
a base having a central access hole formed about a central axis, and a planar surface perpendicular to the axis provided with the concentric inner and outer seal surfaces;
a rotary housing having inner and outer seal surfaces for cooperation with the inner and outer seal surfaces of said base, said rotary housing being pivotably attached to said base and rotatable about the central axis to define therebetween a toroid-shaped annular cavity;
a stationary block fixed to said base, projecting into said annular cavity and sealingly cooperating with said rotary housing;
a rotary block fixed to said rotary housing and projecting into said annular cavity sealingly cooperating with fluid-tight annular segments whereby the rotation of the rotary housing relative to the base causes one annular segment to increase in volume and the other annular segment to correspondingly decrease;
fluid passage means for admitting and removing fluid from each of said annular segments for causing the rotation of the rotary housing relative to the base; and
clockwise and counter-clockwise stop means to stop the rotation of the rotary housing relative to the base at variable predetermined annular clockwise and counter-clockwise orientations with at least one of said stop means being adjustable enabling the total travel of said rotary housing relative to the base to be varied.

17. The invention of claim 16 wherein said rotary housing is further provided with a central access hole coaxially aligned with the central access hole of the base.

18. The invention of claim 16 wherein the maximum total travel of said rotary housing relative to the base is greater than 180° and less than 315°.

* * * * *

UNITED STATES PATENT AND TRADEMARK OFFICE
CERTIFICATE OF CORRECTION

PATENT NO.   :   4,611,797

DATED        :   September 16, 1986

INVENTOR(S)  :   ROBERT CETNAROWSKI

It is certified that error appears in the above-identified patent and that said Letters Patent is hereby corrected as shown below:

In column 7, line 15, change "on" to --- an ---.

In column 7, line 36, after the word "dividing" insert --- said annular cavity into two separate fluid-tight ---.

In column 8, line 29, after the word "with" insert --- said base to divide said annular cavity into two separate ---.

Signed and Sealed this

Second Day of December, 1986

Attest:

DONALD J. QUIGG

Attesting Officer

Commissioner of Patents and Trademarks